(12) United States Patent
Heydari

(10) Patent No.: US 11,063,961 B1
(45) Date of Patent: Jul. 13, 2021

(54) MOVING TARGET DEFENSE SYSTEMS AND METHODS

(71) Applicant: Vahid Heydari, Huntsville, AL (US)

(72) Inventor: Vahid Heydari, Huntsville, AL (US)

(73) Assignee: Board of Trustees of the University of Alabama, for and on behalf of The University of Alabama in Huntsville, Huntsville, AL (US)

( * ) Notice: Subject to any disclaimer, the term of this patent is extended or adjusted under 35 U.S.C. 154(b) by 292 days.

(21) Appl. No.: 15/600,175

(22) Filed: May 19, 2017

Related U.S. Application Data

(60) Provisional application No. 62/338,665, filed on May 19, 2016.

(51) Int. Cl.
*H04L 29/06* (2006.01)

(52) U.S. Cl.
CPC ...... *H04L 63/1416* (2013.01); *H04L 63/1433* (2013.01); *H04L 63/1458* (2013.01)

(58) Field of Classification Search
CPC combination set(s) only.
See application file for complete search history.

(56) References Cited

U.S. PATENT DOCUMENTS

| | | | |
|---|---|---|---|
| 7,142,971 B2 | 11/2006 | Brown et al. | |
| 7,152,238 B1 | 12/2006 | Leung | |
| 8,761,007 B1* | 6/2014 | Damle | H04L 45/18 370/229 |
| 9,985,984 B1* | 5/2018 | Chavez | H04L 63/1441 |
| 10,237,287 B1* | 3/2019 | Amidon | H04L 63/1433 |
| 2003/0016655 A1 | 1/2003 | Gwon | |
| 2003/0115364 A1* | 6/2003 | Shu | H04L 12/4633 709/246 |
| 2005/0008032 A1 | 1/2005 | Yamamoto | |
| 2005/0172155 A1* | 8/2005 | Sheymov | G06Q 20/10 726/5 |

(Continued)

OTHER PUBLICATIONS

Lum, et al., "Teleoperation of a Surgical Robot Via Airborne Wireless Radio and Transatlantic Internet Links," Berlin, Heidelberg: Springer Berlin Heidelberg, pp. 305-314, 2008.

(Continued)

*Primary Examiner* — Jason Chiang
(74) *Attorney, Agent, or Firm* — Joe E. Holland; Maynard Cooper & Gale, P. C.

(57) ABSTRACT

Systems and methods are provided to implement a moving target defense for a server computer. The server computer can be provided both a permanent IP address and a temporary IP address. The temporary IP address can be used when communicating with client computers connected to the server computer. The temporary IP address can be dynamically changed at a predetermined interval that can be varied based on conditions at the server computer. An intrusion detection system can be used with the moving target defense systems and methods to identify attacks on the server computer based on the temporary IP address(es) provided by the server computer. When an attack is identified, the corresponding client computer is determined based on the temporary IP address and the client computer is placed on a blacklist that is not provided with new temporary IP addresses when the server computer changes temporary IP address.

20 Claims, 5 Drawing Sheets

(56) References Cited

U.S. PATENT DOCUMENTS

| | | | |
|---|---|---|---|
| 2007/0214501 A1 | 9/2007 | Muramoto | |
| 2008/0043739 A1 | 2/2008 | Suh | |
| 2009/0257401 A1 | 10/2009 | Hirano | |
| 2009/0265777 A1* | 10/2009 | Scott | H04L 63/1441 726/11 |
| 2010/0278099 A1* | 11/2010 | Lee | H04L 29/06027 370/328 |
| 2013/0198840 A1* | 8/2013 | Drissi | G06F 21/55 726/22 |
| 2013/0212249 A1 | 8/2013 | Groat et al. | |
| 2013/0263256 A1* | 10/2013 | Dickinson | H04L 63/1416 726/22 |
| 2013/0304927 A1* | 11/2013 | Abu-Amara | H04L 61/1511 709/227 |
| 2015/0058976 A1* | 2/2015 | Carney | H04L 63/1458 726/22 |
| 2016/0065612 A1* | 3/2016 | Evans | G06F 21/53 726/22 |
| 2016/0112452 A1* | 4/2016 | Guevin | H04L 61/103 726/1 |
| 2016/0323313 A1* | 11/2016 | Narain | H04L 63/1475 |
| 2017/0195295 A1* | 7/2017 | Tatlicioglu | H04L 45/74 |

OTHER PUBLICATIONS

Manadhata, et al., "An attack surface metric," IEEE Transactions on Software Engineering, vol. 37, No. 3, pp. 371386, May 2011.

Stavrou, et al., "Move: an end-to-end solution to network denial of service," Proceedings of the Internet Society (ISOC) Symposium on Network and Distributed Systems Security (SNDSS), pp. 1-16, Feb. 2005.

Wang, et al., "A moving target ddos defense mechanism," Computer Communications, vol. 46, pp. 10-21, 2014.

Wang, et al., "Catch me if you can: A cloud-enabled ddos defense," IEEE/IFIP Dependable Systems and Networks, pp. 264-275, 2014.

Danev, et al., "Enabling secure vm-vtpm migration in private clouds," in Proceedings of the 27th Annual Computer Security Applications Conference, pp. 187-196, 2011.

Zhang, et al., "Incentive Compatible Moving Target Defense against VM-Colocation Attacks in Clouds," Berlin, Heidelberg: Springer Berlin Heidelberg, pp. 388-399, 2012.

Okhravi, et al., "Creating a cyber moving target for critical infrastructure applications using platform diversity," International Journal of Critical Infrastructure Protection, vol. 5, No. 1, pp. 30-39, 2012.

Hong, et al., "Assessing the effectiveness of moving target defenses using security models," IEEE Transactions on Dependable and Secure Computing, vol. 13, No. 2, pp. 163-177, Mar. 2016.

Dunlop, et al., "Mt6d: A moving target ipv6 defense," AFCEA/IEEE MILCOM, pp. 1321-1326, 2011.

Morrell, et al., "Scaling ipv6 address bindings in support of a moving target defense," Internet Technology and Secured Transactions (ICITST), pp. 440-445, 2014.

Mathiesen, "Access to information as a human right," SRRN, pp. 1-20, Sep. 2008.

Dingledine, et al., "Tor: The second generation onion router," USENIX Security Symposium, pp. 1-17, 2004.

Stavrou, et al., "Move: an end-to-end solution to network denial of service," pp. 1-16, 2005.

Winter, et al., "How the great firewall of china is blocking for," 2nd USENIX Workshop on Free and Open Communications on the Internet, pp. 1-7, 2012.

Moghaddam, et al., "Skypemorph: Protocol obfuscation for tor bridges," ACM Conference on Computer and Communications Security, pp. 1-13, 2012.

Weinberg, et al., "Stegotorus: A camouflage proxy for the tor anonymity system," ACM Conference on Computer and Communications Security, pp. 109-120, 2012.

Houmansadr, et al., "The parrot is dead: Observing unobservable network communications," IEEE Symposium on Security and Privacy, 66. 65-79, 2013.

Karlin, et al., "Decoy routing: Toward unblockable internet communication," USENIX Workshop on Free and Open Communication on the Internet, pp. 1-6, 2011.

Houmansadr, et al., "Cirripede: Circumvention infrastructure using router redirection with plausible deniability," ACM Conf. on Computer and Comm. Security, pp. 1-13, 2011.

Wustrow, et al., "TapDance: End-to-middle anticensorship without flow blocking," USENIX Security Symposium, pp. 159-174, 2014.

Wustrow, et al., "Telex: Anticensorship in the network infrastructure," USENIX Conference on Security, pp. 1-15, 2011.

Schuchard, et al., "Routing around decoys," ACM Conf. on Computer and Comm. Security, pp. 1-12, 2012.

Heydari, et al., "Scalable Anti-Censorship Framework using Moving Target Defense for Web Servers," IEEE Transactions on Information Forensics and Security, vol. 12, No. 5, pp. 1113-1124, May 2017.

Heydari, et al., "Anti-Censorship Framework using Mobile IPv6 based Moving Target Defense," Proc. Acm 11th Annual Cyber and Information Security Research, pp. 1-8, 2016.

Heydari, et al., "Securing Critical Infrastructure by Moving Target Defense," 11th International Conference on Cyber Warfare and Security, pp. 382-390, 2016.

Heydari, et al., "Secure VPN Using Mobile IPv6 Based Moving Target Defense," 2016 IEEE Global Communications Conference (GLOBECOM), pp. 1-6, 2016.

H. Soliman, "Mobile IPv6," Addison-Wesley, pp. 1-4, 2004.

Perkins, et al., "Mobility support in ipv6," Internet Requests for Comments, RFC 6275, pp. 1-169, Jul. 2011.

Gil, et al., "Multops: A data-structure for bandwidth attack detection," Proceedings of the 10th Conference on USENIX Security Symposium, vol. 10, pp. 1-12, 2001.

Hussain, et al., "A framework for classifying denial of service attacks," Proceedings of the 2003 Conference on Applications, Technologies, Architectures, and Protocols for Computer Communications, pp. 99-110, 2003.

Jafarian, et al., "Openflow random host mutation: Transparent moving target defense using software defined networking," Proceedings of the First Workshop on Hot Topics in Software Defined Networks, pp. 127-132, 2012.

Kaufman, et al., "Internet key exchange protocol version 2 (ikev2)," Internet Requests for Comments, pp. 1-142, Oct. 2014.

Thomson, et al., "Ipv6 stateless address autoconfiguration," Internet Requests for Comments, RFC 4862, pp. 1-30, Sep. 2007.

Johnson, et al., "Mobility support in ipv6," Internet Requests for Comments, RFC 3775, pp. 1-165, Jun. 2004.

C. Perkins, "Securing mobile ipv6 route optimization using a static shared key," Internet Requests for Comments, RFC 4449, pp. 1-7, Jun. 2006.

Nikander, et al., "Mobile ip version 6 route optimization security design background," Internet Requests for Comments, RFC 4225, pp. 1-37, Dec. 2005.

Narten, et al., "Neighbor discovery for ip version 6 (ipv6)," Internet Requests for Comments, RFC 4861, pp. 1-97, Sep. 2007.

Arkko, et al., "Enhanced route optimization for mobile ipv6," Internet Requests for Comments, RFC 4866, pp. 1-54, May 2007.

Wakikawa, et al., "Multiple care-of addresses registration," Internet Requests for Comments, RFC 5648, pp. 1-36, Oct. 2009.

Ebalard, "Mobile ipv6 ipsec route optimization (iro)," Working Draft, IETF Secretariat, Internet-Draft draft-ebalardmext-ipsec-ro-02, pp. 1-41, Jul. 2010, http://www.ietf.org/internet-drafts/draft-ebalard-mext-ipsec-ro-02.txt.

Zetter, "Hackers Could Commandeer New Planes Through Passenger Wi-Fi j WIRED," http://www.wired.com/2015/04/hackers-commandeer-new-planes-passenger-wi-fi/, pp. 1-6, May 28, 2006.

"Cisco asa software ikev1 and ikev2 buffer overflow vulnerability," http://tools.cisco.com/security/center/content/CiscoSecurityAdvisory/cisco-sa-20160210-asa-ike, pp. 1-3, Aug. 5, 2016.

"Scapy," http://www.secdev.org/projects/scapy/, pp. 1-3, Oct. 4, 2015.

(56) References Cited

OTHER PUBLICATIONS

"D-itg | distributed internet traffic generator," http://traffic.comics.unina.it/software/ITG/, p. 1, Mar. 24, 2016.
"F-secure j switch on freedom," https://www.f-secure.com/en_US/welcome, pp. 1-2, Oct. 4, 2015.
"Free VPN service j free VPN software—hotspot shield VPN," http://www.hotspotshield.com/, pp. 1-3, Oct. 4, 2015.
"Psiphon j uncensored internet access for windows and mobile," https://psiphon3.com/en/index.html, p. 1, Oct. 4, 2015.
Heydari, et al., U.S. Appl. No. 15/461,099, entitled, "Systems and Methods for Preventing Remote Attacks Against Transportation Systems," filed Mar. 16, 2017.
Heydari, et al., U.S. Appl. No. 15/478,846, entitled, "Anti-Censorship Framework Using Moving Target Defense Systems and Methods," filed Apr. 4, 2017.

\* cited by examiner

MOVING TARGET DEFENSE SYSTEMS AND METHODS

CROSS-REFERENCE TO RELATED APPLICATIONS

This application claims the benefit of U.S. Provisional Application No. 62/338,665, entitled "Moving Target Defense Systems and Methods" and filed on May 19, 2016, which application is hereby incorporated by reference in its entirety.

BACKGROUND

The present application generally relates to system and methods for dynamically changing IP (Internet Protocol) addresses of computing devices using moving target defense techniques.

Computing devices connected to a network such as the Internet or a virtual private network can be susceptible to remote attacks from anywhere in the world. Two types of remote attacks used to compromise computing devices are denial-of-service (DoS) attacks and remote exploits. To implement a remote attack on a computing device, an attacker has to collect information, e.g., the IP address and one or more port numbers, about the target (or victim) computing device. A computing device with a static IP address, i.e., an IP address that does not change, may be more vulnerable to attack because the IP address can be easily discovered by an attacker and the attacker can maintain access to the computing device for an extended time period.

A moving target defense can be used to prevent or restrict attacks against the computing device. The moving target defense can randomly and dynamically change the IP address of the computing device. The moving target defense can be used for both the treatment and prevention of remote attacks on a computing device. One example of a moving target defense that can be used for the prevention of attacks is MT6D. Some drawbacks of MT6D are the possibility of packet loss from an address collision and the use of a static address rotation interval, i.e., the address is changed at a constant time period.

SUMMARY

The present application generally pertains to moving target defense systems and methods that combat remote attacks against a server or VPN (virtual private network) server. The moving target systems and methods randomly change the server's address at a predefined interval. The clients communicating with the server are updated to the server's new addresses using a binding update procedure. In addition, the moving target systems and methods can identify a remote attacker by using an intrusion detection system and the changing of the server's address to determine which connected client is attacking the server.

One advantage of the present application is the elimination of packet losses from address collisions.

Another advantage of the present application is the ability to have dynamic address rotation intervals.

Still another advantage of the present application is that the sharing of new IP address with attacking computers is avoided.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

The present application generally pertains to systems and methods for implementing a moving target defense that has a permanent IP address, the home address, which is used to avoid disrupting TCP sessions and a temporary IP address, the care-of address, which is used to connect to other nodes or computers. The moving target defense system and methods can dynamically change the care-of address of a server, effectively making the server a moving target, even though the server may not actually be mobile. A shuffling interval can be used to determine when to change the care-of address. In one embodiment, the server is able to adjust the shuffling interval based on the conditions present at the server.

The moving target defense systems and methods can be combined with an intrusion detection scheme to support secure virtual private networks and identify attackers. In the combined approach, a dynamically adjustable shuffling interval is utilized, based on the level of trust with the clients connected with the server. A long shuffling interval can be used by default, and a shuffling (or changing) of the IP address(es) can occur if an attack is suspected. The combined approach can be used for internal attack isolation by keeping a blacklist of the IP addresses (source and/or destination) used by attackers. When IP address shuffling is performed, the clients at IP addresses that are on the blacklist are not updated with a new IP address thereby preventing the client from communicating with the server. In addition, the combined approach can use multiple IP addresses that are distributed to different users (or groups of users) across the available IP address space to identify the attacker or a covert adversary working with an attacker based on the IP address being used by the attacker, since the distribution of the IP addresses is known.

Figure 1:
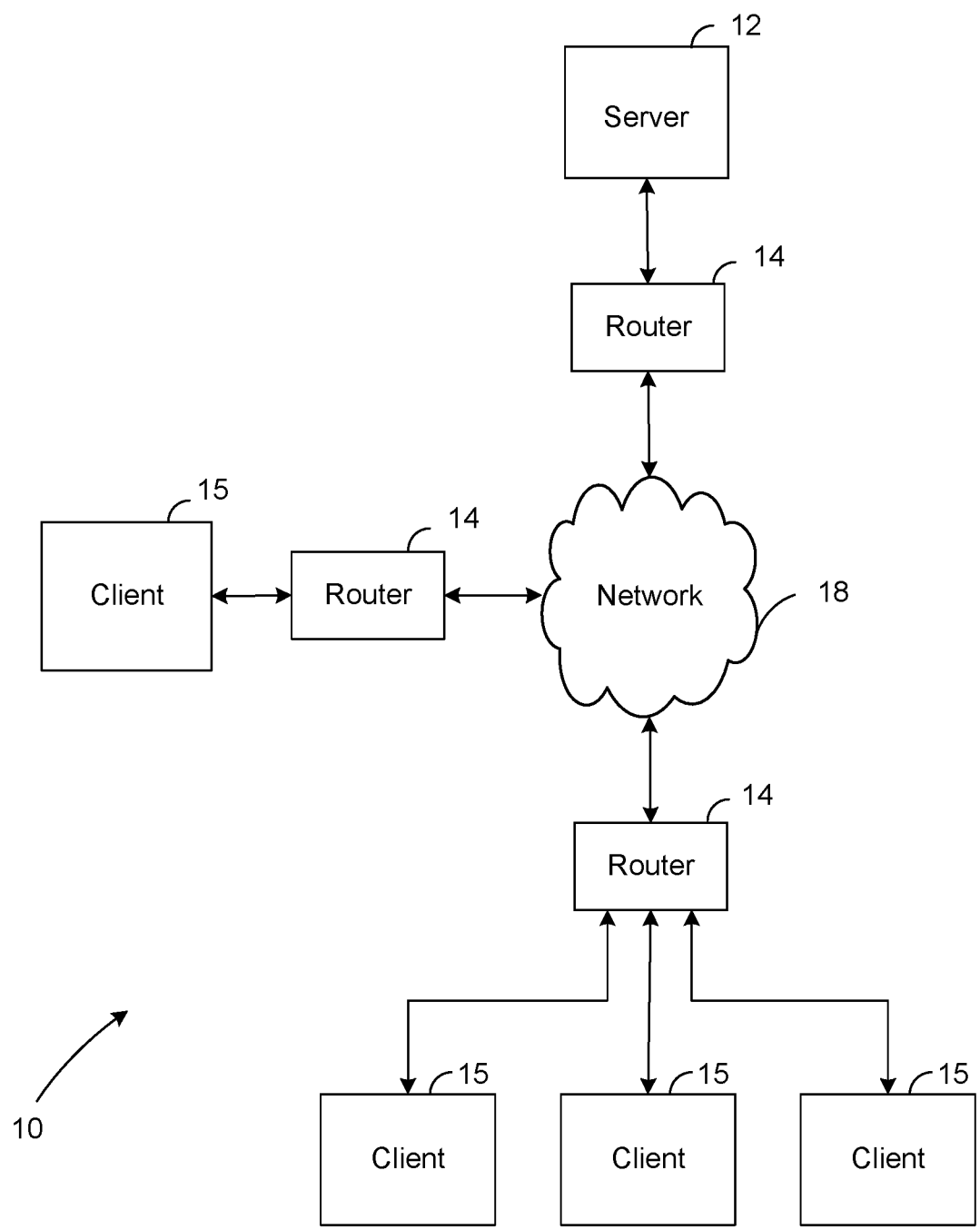
FIG. 1 shows a block diagram of an embodiment of a computer network.

FIG. 1 shows an embodiment of a computer network 10. The network 10 includes a server computer 12 (also referred to as a mobile node) in communication with one or more client computers 15 (also referred to as correspondent nodes) over a network 18. Each client computer 15 is communicatively coupled to the network 18 by a router 14 to exchange, i.e., send and receive, instructions, data and/or information with the server computer 12. The client computers 15 can be coupled to the routers 14 and the routers 14 can be coupled to the network 18. Each router can be coupled to one or more client computers 15 and provide a communication path from the client computer 15 to the network 18. Similarly, the server computer 12 can be coupled to a router 14 that is coupled to the network 18. In other embodiments, one or more of the server computer 12 and the client computers 15 may be coupled directly to network 18 without using a router 14.

In another embodiment, the server computer 12 can also be coupled to a computer or home agent (not shown) by a switch (not shown). The switch can be used to couple and decouple the server computer 12 and the home agent. In one embodiment, the switch can be a layer 3 switch. The home agent can be coupled to the network 18 and can act on behalf of the server computer 12 (like a proxy) when the switch couples the home agent and the server computer 12. The server computer 12 can be coupled to the home agent by the switch during a registration process between the server computer 12 and the home agent (which can assign a home address to the server computer 12) while at the same time the server computer 12 can be disconnected from router 14 by another switch or other mechanism. When the registration process is completed the server computer 12 can be disconnected from the home agent by the switch and connected to router 14 and network 18.

In one embodiment, the client computers 15 can be, but are not limited to, a desktop, laptop or tablet computer, a hand-held device, such as a cellular telephone (e.g., smartphone) or portable gaming device, a television, a video game system, a still and/or video camera, an attachable, wearable, implantable or non-invasive computer or device, and/or a smart thing. In another embodiment, the client computers 15 can be a programmable logic controller (PLC) or a Human Machine Interface (HMI) of Supervisory Control And Data Acquisition (SCADA) systems. The client computers 15 can each have one or more input devices to permit a user to enter instructions, data and/or information for communication over network 18 and one or more output devices to permit the user to display instructions, data and/or information received over the network 18. In another embodiment, the network 18 can be the Internet and use the transmission control protocol/Internet protocol (TCP/IP) to communicate over the network 18. However, in other embodiments, the network 18 may be an Intranet, a local area network (LAN), a wide area network (WAN), a Near Field Communication (NFC) Peer to Peer network, Internet of Things, or any other type of communication network using Internet protocol.

Figure 2:
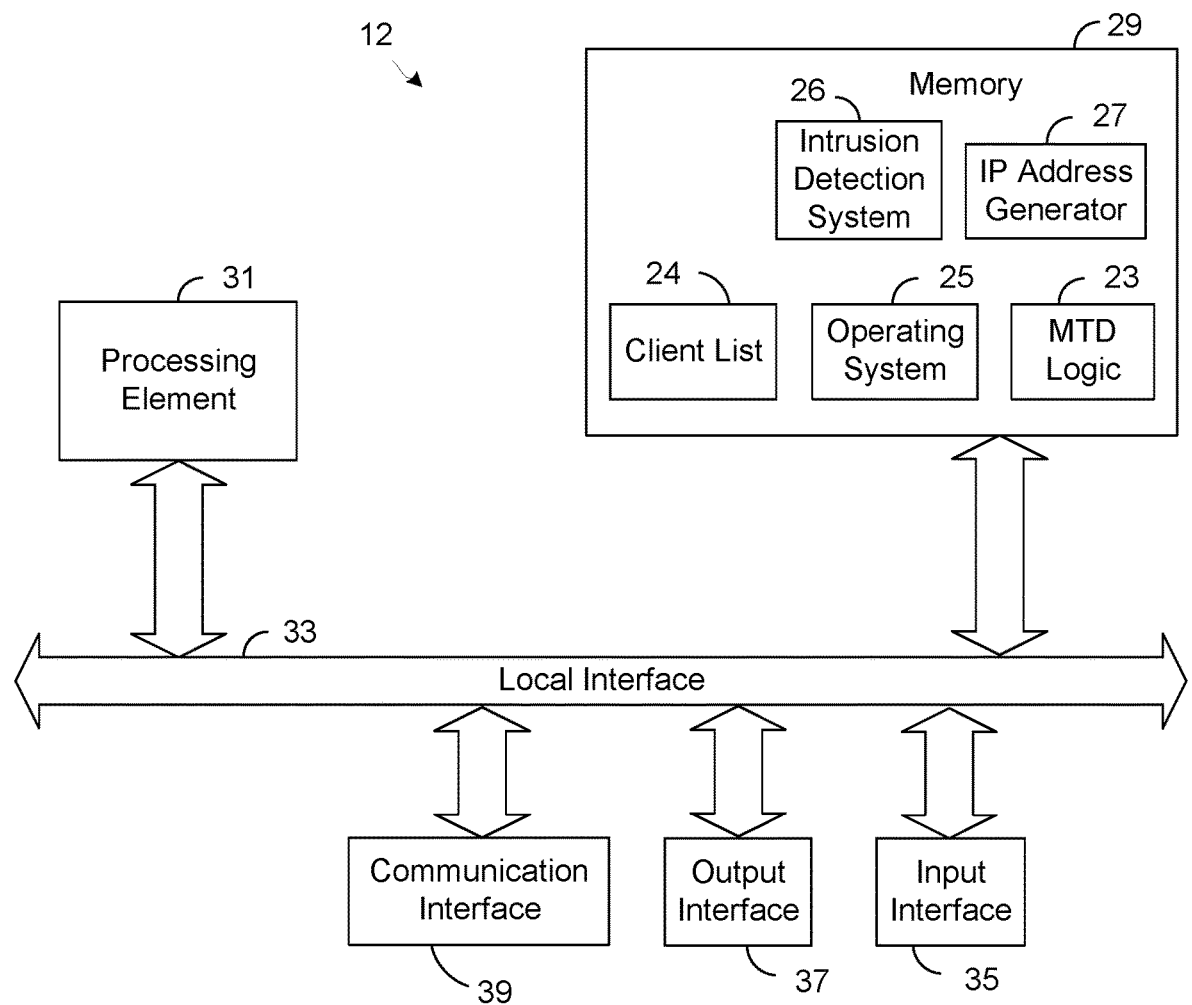
FIG. 2 shows a block diagram of a server computer from the computer network of FIG. 1.

FIG. 2 depicts an embodiment of the server computer 12. The server computer 12 may be any device capable of processing and communicating data, such as a personal computer (e.g., a desktop or laptop) a hand-held computing device (e.g., a personal digital assistant (PDA), cellular telephone, tablet computer, portable gaming device or a still and/or video camera), a television, a video game system, an attachable, wearable, implantable or non-invasive computer or device, and/or a smart thing. In another embodiment, the server computer 12 can be a programmable logic controller (PLC) or a Human Machine Interface (HMI) of Supervisory Control And Data Acquisition (SCADA) systems. The server computer 12 has an operating system 25 for generally controlling the operation of the server computer 12. The server computer 12 also has MTD (moving target defense) logic 23 that operates in conjunction with the operating system 25 to control the IP (Internet protocol) addresses used by the server computer 12 when communicating over network 18. The MTD logic 23 can use random IP addresses generated by the IP address generator 27. The server computer 12 has an intrusion detection system 26 to detect attempts by attackers to access the server computer 12. The operating system 25, MTD logic 23, intrusion detection system 26 and IP address generator 27 can be implemented in software, hardware, firmware or any combination thereof. In the server computer 12 shown by FIG. 2, the operating system 25, MTD logic 23, intrusion detection system 26 and IP address generator 27 can be implemented in software and stored in memory 29. Note that the operating system 25, MTD logic 23, intrusion detection system 26 and IP address generator 27, when implemented in software, can be stored and transported on any computer-readable medium for use by or in connection with an instruction execution apparatus that can fetch and execute instructions. In one embodiment, the operating system 25 can be Microsoft Windows, Apple OS X, Linux, Android, iOS or any other similar type of operating system that control the server computer 12 and communicate over network 18.

The server computer 12 has at least one conventional processing element 31, which has processing hardware for executing instructions stored in memory 29. As an example, the processing element 31 may include a central processing unit (CPU) or a digital signal processor (DSP). The processing element 31 communicates to and drives the other elements within the server computer 12 via a local interface 33, which can include at least one bus. Furthermore, an input interface 35, for example, a keypad, keyboard or a mouse, can be used to input data from a user of the server computer 12, and an output interface 37, for example, a printer, monitor, liquid crystal display (LCD), or other display apparatus, can be used to output data to the user. Further, a communication interface 39, such as at least one modem, may be used to communicate with the router 14 and/or network 18.

The MTD logic 23 can be used to prevent remote attacks against server computer 12 by providing dynamic IP addresses for the server computer 12. In one embodiment, the MTD logic 23 can be based on Mobile IPv6 (Internet Protocol version 6). The MTD logic 23 uses the home address of the server computer 12 to be the permanent address of the server computer 12 and a care-of address of the server computer 12 to be the dynamic IP address provided to client computers 15. In one embodiment, the home address of the server computer 12 can be assigned an IP address that is different from any possible care-of address that the server computer 12 may use. For example, the care-of address for the server computer 12 may use a portion of the IP address for the router 14 connected to the server computer 12 and the home address would be assigned an address such that the portion of the IP address for the router 14 used in the care-of address is not used for the home address. In another embodiment, the home address can be assigned by a home agent connected to the server computer 12. Only the care-of address of the server computer 12 is accessible by the client computers 15. The IP address generator 27 is used to dynamically rotate the care-of address of the server computer 12 for the MTD logic 23. The use of the home address as the permanent address for the server computer can provide transparency to applications operating on the server computer 12. In addition, since the server computer 12 can be connected to the network 18 via router 14, the home address is not accessible through the network 18. The only accessible IP address of the server computer 12 is the care-of address which is rotated randomly and dynamically.

The MTD logic 23 (through Mobile IPv6) enables the client computers 15 to cache the binding of the server computer's permanent IP address with its dynamic IP address (the care-of address) and then send any packets destined for the server computer 12 directly to the server computer 12 using the dynamic IP address. A binding update mechanism/process can be used to inform client computers 15 of the dynamic IP address of the server computer 12. The client computers 15 can use the new dynamic IP address from the server computer 12 only after receiving the new address in a binding update message from the server computer 12, which has registered the new dynamic IP address. The MTD logic 23 can decide which client computers 15 should be informed of the new dynamic IP address. If the MTD logic 23 is informed of an attack from one of the client computers 15 by intrusion detection system 26, the MTD logic can ignore updating that client computer 15 with the new dynamic IP address, thereby preventing the attacker from having access to the server computer 12 after address-rotating (i.e., changing of the dynamic IP address) of the server computer 12.

As part of the registration process discussed above, the server computer 12 is connected to network 18 and the MTD logic 23 can create a care-of address for the server computer 12, based on information received in a route advertisement message from the router 14 connected to the server computer 12, using the stateless address auto configuration of IPv6. The MTD logic 23 can then bind the care-of address for the server computer 12 to the home address for the server computer 12. Once the binding of the home address and the care-of address is complete, the server computer 12 should not be accessible by the home address. Thus, a new client computer 15 cannot have access to the server computer 12 by the server computer's home address.

The MTD logic 23 can then start the route optimization process by sending a packet from the server computer 12 to each client computer 15 using a static shared key method. In one embodiment, the server computer 12 can send a binding update message to each client computer 15 and wait to receive a corresponding binding acknowledgement message from each client computer 15. In another embodiment, the MTD logic 23 can use IPsec with Internet Key Exchange (IKE) when communicating between the server computer 12 and client computers 15.

Figure 3:
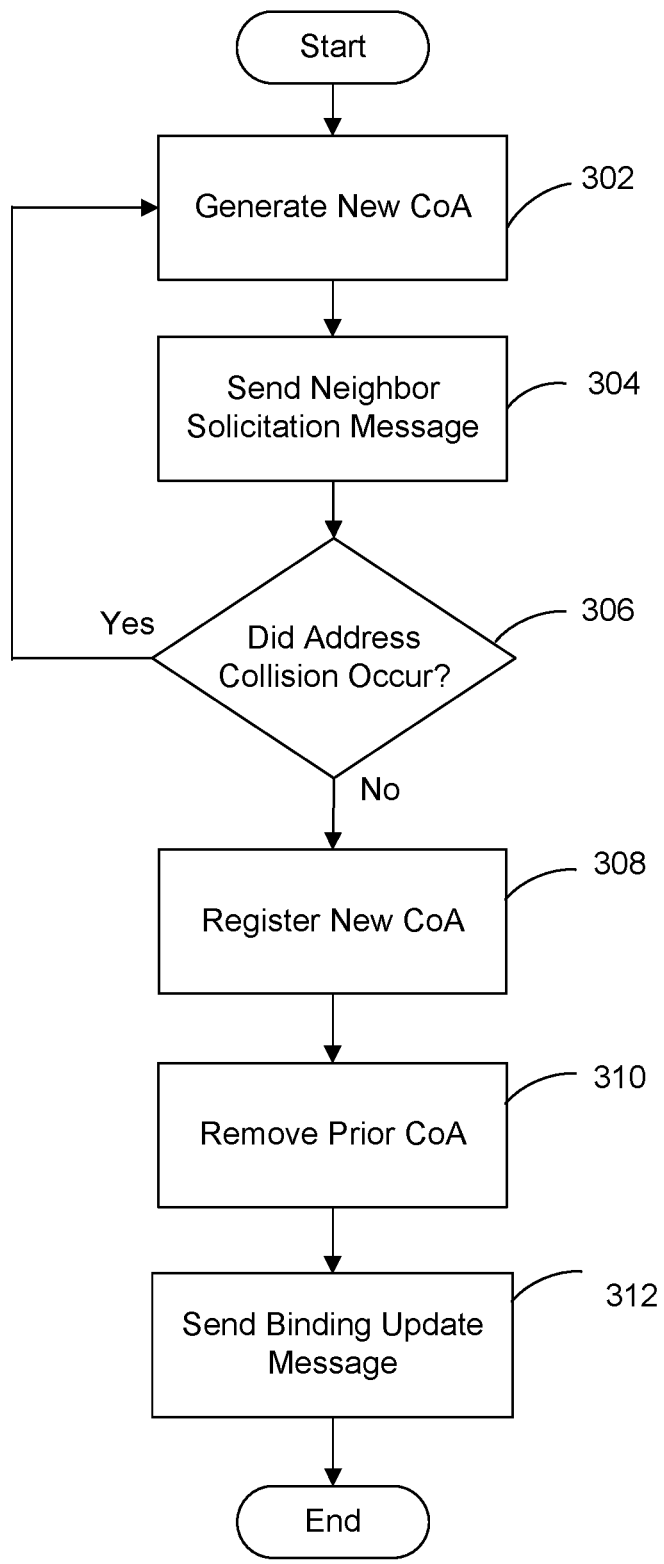
FIG. 3 is a process diagram showing an embodiment for changing the IP address of the server computer from the computer network of FIG. 1.

FIG. 3 shows an embodiment of a process for updating the care-of address of the server computer 12. The process begins by generating a new CoA (care-of address) by the IP address generator 27 (step 302). The IP address generator 27 can randomly generate a new IP address as the CoA of the server computer 12. The IP address generator 27 can create a random 64 bit address and combine the randomly created address with the highest significant 64 bits of the current CoA to generate the new CoA. In other embodiments, the random portion of the new CoA and the highest significant bits portion of the new CoA can be of different bit lengths depending on the size of the CoA and the desired amount randomness to be incorporated into the new CoA.

The new CoA is then checked to determine if it is unoccupied, i.e., available, by sending a neighbor solicitation message (step 304) before registering the new CoA. The MTD logic 23 can then detect if an address collision occurred, i.e., the new CoA is being used by another device (step 306). If an address collision occurred, the process returns to step 302 for a new CoA. If no collision is detected, then the new CoA can be registered (step 308) and the previous CoA can be removed (step 310). The MTD logic 23 can then send a binding update message (step 312) to the client computers 15 connected to the server computer 12 to inform the client computers 15 of the new CoA. The client computers 15 can then send a binding acknowledgement message to the server computer 12, notifying the server computer 12 that the client computers 15 have been informed of the new CoA.

In one embodiment, the process of FIG. 3 can be repeated on a selected time interval, which can be referred to as a shuffling interval. The shuffling interval can range from shorter time periods such as 5 or 10 seconds (down to about 2 seconds) to longer time periods such as 1 or 2 minutes (or greater) depending on the activity at the server computer 12. During the update procedure, the server computer 12 cannot be accessed by client computers 15 until they receive the binding update messages with the new CoAs.

In one embodiment, when one of the client computers 15 is rebooted, the client computer 15 only needs to wait for the next binding update message from the server computer 12 before communicating. After that time, the client computer 15 can have access to the server computer 12 since it has the proper CoA for the server computer 12 from the binding update message. To add a new client computer 15 to the server computer 12, the server computer 12 has to send a packet to the new client computer 15. In one embodiment, the new client computer 15 has to contact the server computer 12 using an out-of-band request (e.g., email, webpage, etc.) and the server computer 12 initiates the connection setup. For example, in a VPN, a solution using authenticated email messages can be implemented for the out-of-band request. In one embodiment, the request from the new client computer 15 needs to provide the client's IP address and the necessary data for authentication. During the authentication process, the MTD logic 23 can check a client list 24 (see FIG. 2) to send the packet. The address of the new client computer 15 should not be found in the client list 24, so the MTD logic 23 can automatically start the route optimization mechanism to the new client computer 15. In another embodiment, a blacklist or a whitelist in the client list 24 can be used by the MTD logic 23 to evaluate the access permission of the client computer 15 to the server computer 12.

The MTD logic 23 can also assign multiple CoAs to the server computer 12. The different CoAs can be used to communicate with different client computers 15 (or groups of client computers 15). The CoAs are dynamically generated (pseudo-random IP selection) by the IP address generator 27 and changed after a predetermined time period or shuffling interval. The predetermined time period or shuffling interval may be adjusted by the server computer 12 to be either a longer time period or a shorter time period based on conditions at the server computer 12. During each shuffling interval, a new CoA is assigned to each client computer 15 and the client computer 15 is notified via a binding update message.

Figure 6:
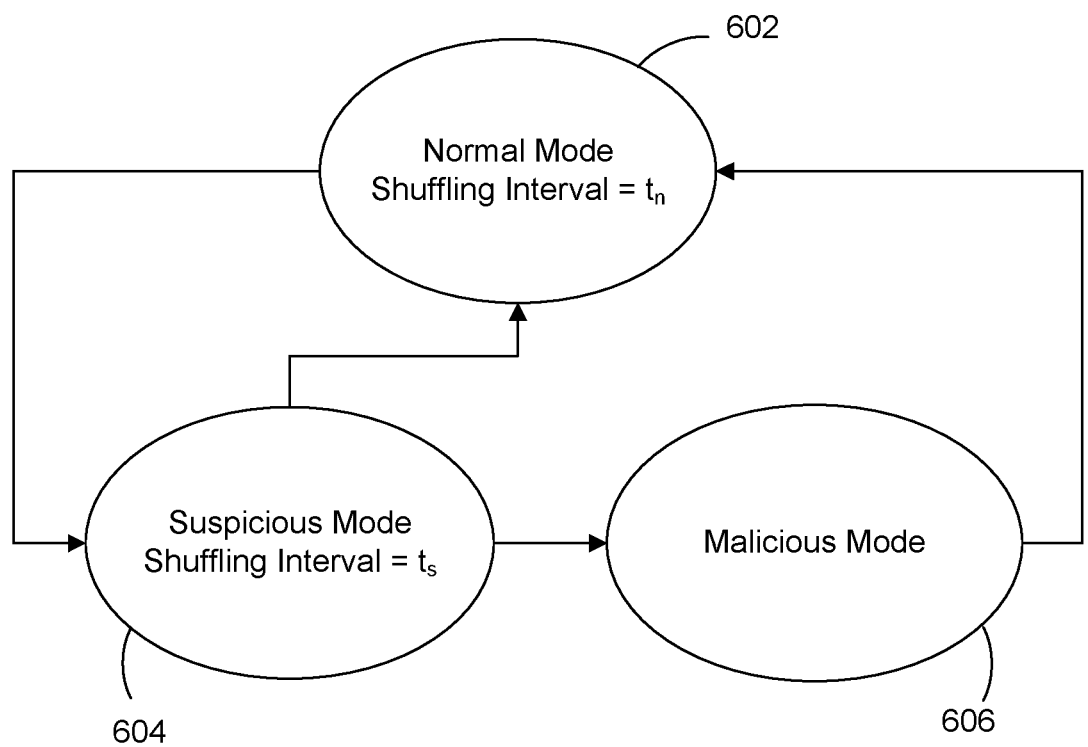
FIG. 6 is a state diagram showing the states of client computers associated with the process of FIG. 4.

In one embodiment, the MTD logic 23 can maintain mode information for each client computer 15 in client list 24 (see FIG. 2). In addition to mode information, the client list 24 can store other information, e.g., IP address, about each client computer 15 connected to the server computer 12. The mode information for a client computer 15 can correspond to the threat level the client computer 15 poses to the server computer 12. The MTD logic 23 can categorize each client computer 15 into one of three modes: a normal mode 602; a suspicious mode 604; or a malicious mode 606 as shown in FIG. 6. Each client computer 15 can be initially categorized into the normal mode 602, which corresponds to the client computer 15 communicating appropriately with the server computer 12 and posing no threat to the server computer 12. The normal mode 602 can have a shuffling interval $t_n$ that can be longer than the shuffling interval $t_s$ for the suspicious mode 604. The malicious mode 606 does not have a shuffling interval because the MTD logic 23 has determined that the corresponding client computer 15 is an attacker and stopped communicating with that client computer 15.

Figure 4:
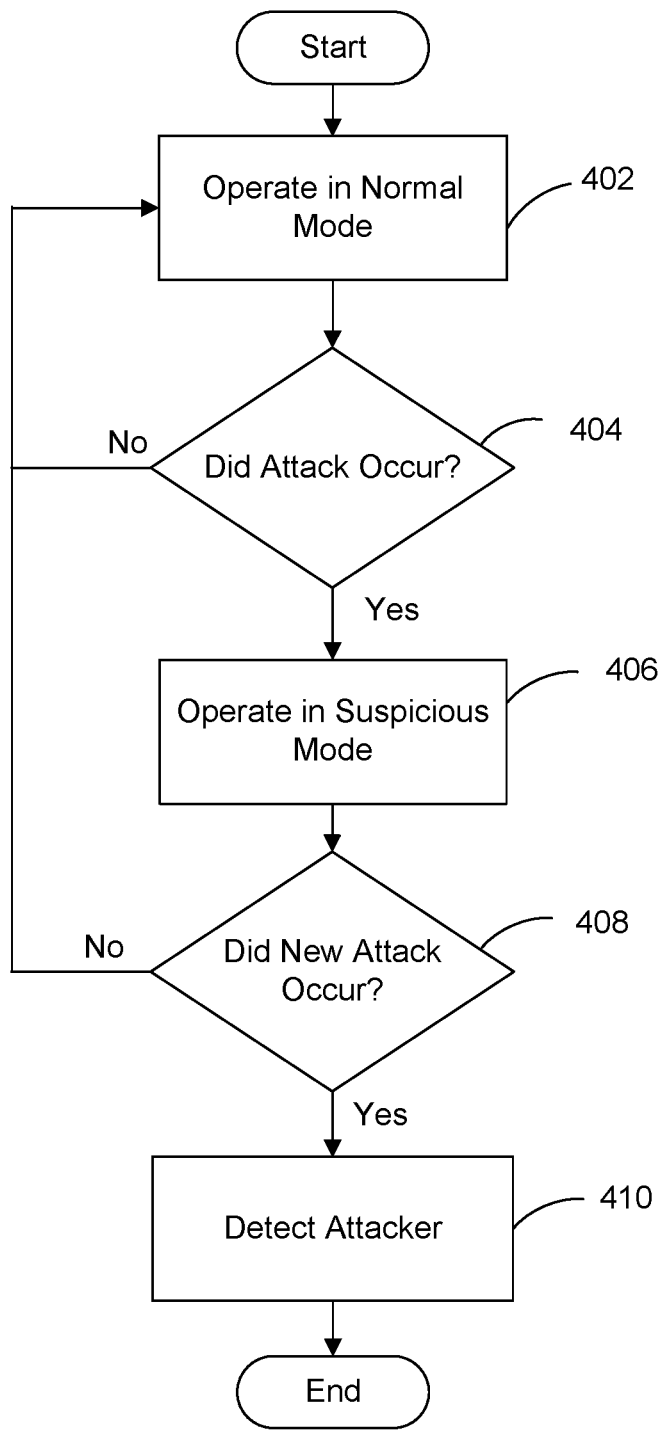
FIG. 4 is a process diagram showing an embodiment for determining an attacker of the server computer from the computer network of FIG. 1.
Figure 5:
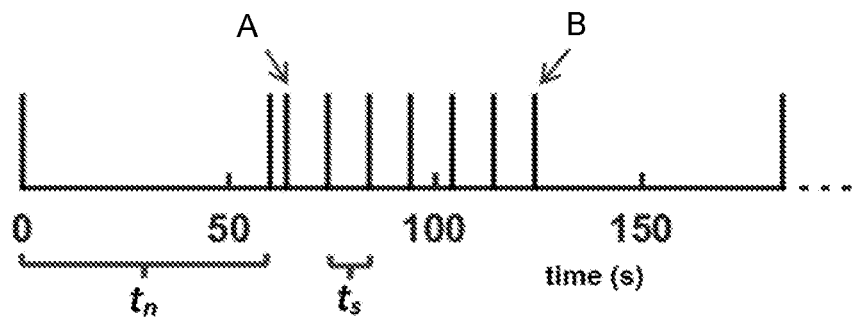
FIG. 5 shows an embodiment of a timeline with shuffling intervals associated with the process of FIG. 4.

FIG. 4 shows an embodiment of a process for detecting an attacker at the server computer 12. The process begins with the server computer communicating with each client computer 15 in a normal mode 602 (step 402). The intrusion detection system 26 can determine if an attack has occurred at the server computer 12 (step 404). In one embodiment, the intrusion detection system 26 can use an anomaly-based and/or a signature-based detection strategy to determine if an attack has occurred. If no attack is detected, the process returns to step 402 and the server computer 12 continues to communicate with each client computer 15 in the normal mode 602. When operating in the normal mode 602, the MTD logic 23 can change the CoA address for each client computer 15 at the shuffling interval $t_n$, which can be 60 seconds as shown in FIG. 5. However, in other embodiments, different shuffling intervals $t_n$ can be used. In FIG. 5, each vertical line corresponds to the changing of the CoA address for each client computer 15 in communication with the server computer 12.

If the intrusion detection system 26 does detect an attack, the intrusion detection system 26 can determine the client computer 15 making the attack based on the CoA address provided to the client computer 15. When the attack is detected, the MTD logic 23 can automatically change the mode for the client computer 15 to the suspicious mode 604 (step 406) as shown at point A in FIG. 5. In another embodiment, the MTD logic 23 can request a user or administration make the determination of when to operate in suspicious mode 604. When operating in the suspicious mode 604, the MTD logic 23 can change the CoA address for each client computer 15 in the suspicious mode 604 at the shuffling interval $t_s$, which can be 10 seconds as shown in FIG. 5. However, in other embodiments, different shuffling intervals $t_s$ can be used. Once the MTD logic 23 is operating in the suspicious mode 604 with respect to a client computer 15, the MTD logic 23 can remain in the suspicious mode 604 for a predetermined number of shuffling intervals $t_s$ or a predetermined time period. In one embodiment, the predetermined number of shuffling intervals $t_s$ can be 6. However, the predetermined number of shuffling intervals $t_s$ can be greater or less than 6 in other embodiments. During operation in the suspicious mode 604, the intrusion detection system 26 can be checking to see if a new attack from the client computer 15 has occurred (step 408).

If no new attack has occurred within the predetermined number of shuffling intervals $t_s$ in the suspicious mode 604, the MTD logic 23 switches the client computer 15 back to normal mode 602 as shown by point B in FIG. 5 and the process returns to step 402. However, if a new attack (or several new attacks) has occurred from the client computer 15 while in the suspicious mode 604, the MTD logic 23 determines that client computer 15 to be an attacker (step 410) and automatically places that client computer 15 in malicious mode 606 (or notifies the user or administrator to make the determination to switch to malicious mode 606) such that the client computer 15 no longer receives CoA address updates from the MTD logic 23. In one embodiment, an administrator of the server computer 12 can make the determination to remove the malicious mode 606 designation from a client computer 15. However, in other embodiments, other techniques can be used to determine when to remove (if ever) a client computer 15 from malicious mode 606.

As discussed above, the intrusion detection system 26 of server computer 12 can be used to detect an attack or suspicious activity. If an attack or suspicious activity has occurred, the intrusion detection system 26 and MTD logic 23 can identify which client computer is associated with the CoA used by the attack. The MTD logic 23 uses the suspicious mode 604 in response to the detection of an attack to determine if the activity by the client computer 15 is innocent, such as performing an IP scan. The MTD logic 23 can also prevent the client computer 15 in the malicious mode 606 from re-registering with the server computer 12 to regain access. During the registration process, when the credentials verification is performed, the attacker's new registration will match the client information from prior interaction(s) with the server computer 12. The new connection to the client computer 15 is established using the same mode that the client computer was under during the previous session. Hence, a client computer 15 previously in malicious mode 606 can be denied connection to the server computer 12 based on information stored in client list 24 regarding the client computer 15.

In other embodiments, the MTD logic 23 can assign groups of client computers 15 the same CoA address. If an attack is detected from the CoA address of one of the groups of client computers 15, the MTD logic 23 can divide the original group into two or more smaller groups when transitioning to malicious mode 604. The MTD logic 23 can repeat the process of detecting for an attack and reducing the size of the group associated with a CoA address in response to the detection of an attack until the attacking client computer 15 is identified. The number of IP addresses that can be utilized as CoAs at each interval depends on the number of network interfaces and/or servers incorporated in server computer 12.

In one embodiment, 55,000 CoAs can be bound to the server computer 12. With this number of CoAs, the server computer 12 can still complete binding updates in the amount of time necessary for normal network operation. In the worst case, the server computer 12 can have all of the clients computers 15 under suspicious mode 604. In this case, the shuffling interval $t_s$ would be set to the shortest interval setting. If $t_s$=10 seconds, the server computer 12 can have the IP binding capability of 10,000 addresses every interval (10 seconds).

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A method for detecting an attacker of a server computer, the method comprising:
   identifying each client computer of a plurality of client computers connected to the server computer as a non-suspicious computer;
   continuously providing, by the server computer, an IP address for the server computer to each identified non-suspicious computer of the plurality of client computers at a first shuffling interval;
   determining, by the server computer, whether an attack by one or more client computers of the plurality of client computers occurred at the server computer;
   identifying the one or more client computers of the plurality of computers as one or more suspicious computers based on the determining whether an attack by the one or more client computers occurred;
   providing, by the server computer, an updated IP address for the server computer to the one or more suspicious computers at a second shuffling interval for a predetermined number of iterations in response to identifying the one more client computers as one or more suspicious computers, wherein the predetermined number of iterations is three or more;
   determining, by the server computer, whether a subsequent attack by the one or more suspicious computers occurred at the server computer based on the updated IP address provided by the server computer;
   identifying, by the server computer, the one or more suspicious computers as attackers based on the determination that the one or more suspicious computers performed the subsequent attack within the predetermined number of iterations; and
   identifying, by the server computer, the one or more suspicious computers as non-suspicious computers based on the determination that a subsequent attack by the one or more suspicious computers did not occur within the predetermined number of iterations such that the one or more suspicious computers identified as non-suspicious computers is provided an IP address at the first shuffling interval.

2. The method of claim 1, further comprising preventing communication between the server computer and the one or more suspicious computers identified as attackers.

3. The method of claim 2, wherein the preventing communication between the server computer and the one or more suspicious computers identified as attackers includes preventing the one or more suspicious computers from receiving a subsequent IP address for the server computer from the server computer.

4. The method of claim 1, wherein the second shuffling interval is shorter than the first shuffling interval.

5. The method of claim 4, wherein the first shuffling interval is about 60 seconds and the second shuffling interval is about 10 seconds.

6. The method of claim 1, wherein the predetermined number of iterations is six.

7. The method of claim 1, wherein the providing an IP address for the server computer to each client computer includes providing the IP address using a binding update procedure.

8. The method of claim 1, wherein continuously providing an IP address for the server computer to each identified non-suspicious computer of the plurality of client computers includes:
   dividing, by the server computer, the plurality of client computers into two or more groups;
   generating a new IP address for the server computer for each group; and
   providing, by the server computer, the new IP address for the server computer to each client computer in a corresponding group of the two or more groups.

9. The method of claim 8, wherein the determining whether an attack by the one or more client computers occurred at the server computer includes identifying the new IP address for the server computer used by the one or more client computers.

10. The method of claim 9, further comprising:
    dividing, by the server computer, the group of client computers including the one or more suspicious computers using the identified new IP address into two or more sub-groups in response to a determination that a subsequent attack by the one or more client computers occurred at the server computer, wherein one sub-group of the two or more sub-groups includes the one or more suspicious computers;
    generating a second new IP address for the server computer for each sub-group; and
    providing, by the server computer, the second new IP address for the server computer to each client computer in a corresponding sub-group.

11. The method of claim 10, wherein the identifying the one or more suspicious computers as attackers includes iteratively dividing the sub-group of client computers including the one or more suspicious computers using the identified second new IP address into two or more new sub-groups, generating a third new IP address, and providing the third new IP address for the server computer to each client computer in a corresponding new sub-group until only the one or more suspicious computers are using the identified new IP address in a subsequent attack at the server computer.

12. A server computer comprising:
    a communication interface to communicate with a plurality of client computers via a network;
    a processing unit coupled to the communication interface and configured to execute instructions; and
    a memory having the instructions stored thereon and coupled to the processing unit to provide the instructions to the processing unit, wherein the instructions cause the processing unit to:
    identify each client computer of the plurality of client computers connected to the communication interface as a non-suspicious computer;
    continuously provide a care-of address for the server computer to each identified non-suspicious computer of the plurality of client computers at a first shuffling interval;
    determine whether an attack by one client computer of the plurality of client computers occurred at the server computer;
    identify the one client computer as a suspicious computer based on the determination of whether an attack by the one client computer occurred;
    provide an updated care-of address for the server computer to the identified suspicious computer at a second shuffling interval for a predetermined number of iterations in response to the identification of the one client computer as a suspicious computer, wherein the predetermined number of iterations is three or more;

determine whether a subsequent attack by the suspicious computer occurred at the server computer based on the updated care-of address;

identify the suspicious computer as an attacker based on the determination that the suspicious computer performed the subsequent attack within the predetermined number of iterations; and identify the suspicious computer as a non-suspicious computer based on the determination that a subsequent attack by the suspicious computer did not occur within the predetermined number of iterations such that the suspicious computer identified as a non-suspicious computer is provided an IP address at the first shuffling interval.

13. The server computer of claim 12, further comprising a client list stored in memory, the client list including information on each client computer communicating with the server computer, wherein communications between the server computer and a client computer is based on information relating to the client computer in the client list.

14. The server computer of claim 13, the information on each client computer includes a threat level for each client computer, wherein the threat level is one of a first threat level, a second threat level or third threat level.

15. The server computer of claim 14, wherein the instructions further cause the processing unit to:

update the client list to have the threat level for a client computer identified as an attacker to be the third threat level; and prevent communications between the server computer and each client computer having the third threat level in the client list.

16. The server computer of claim 14, wherein the instructions further cause the processing unit to update the client list to have the threat level for the suspicious computer to be the second threat level in response to the determination that an attack by the one client computer occurred at the server computer.

17. The server computer of claim 16, wherein the instructions further cause the processing unit to update the client list to have the threat level for the suspicious computer identified as a non-suspicious computer to be the first threat level in response to the determination that a subsequent attack by the suspicious computer did not occur at the server computer.

18. The server computer of claim 12, wherein the second shuffling interval is shorter than the first shuffling interval.

19. The server computer of claim 12, wherein the instructions further cause the processing unit to:

send the care-of address for the server computer to each client computer in a binding update message; and receive a binding acknowledgement message from each client computer upon each client computer receiving the binding update message.

20. The server computer of claim 12, wherein a home address for the server computer is different from each care-of address and each updated care-of address, and the plurality of client computers are prevented from communicating with the server computer using the home address.

* * * * *